(12) United States Patent
Buzick et al.

(10) Patent No.: US 9,357,878 B2
(45) Date of Patent: Jun. 7, 2016

(54) GRILL WITH SAFETY SYSTEM

(71) Applicants: Bonnie Lee Buzick, Fresno, CA (US); Robert James Bair, Fresno, CA (US)

(72) Inventors: Bonnie Lee Buzick, Fresno, CA (US); Robert James Bair, Fresno, CA (US)

(*) Notice: Subject to any disclaimer, the term of this patent is extended or adjusted under 35 U.S.C. 154(b) by 0 days.

(21) Appl. No.: 13/654,411

(22) Filed: Oct. 17, 2012

(65) Prior Publication Data
US 2014/0102316 A1 Apr. 17, 2014

Related U.S. Application Data

(63) Continuation-in-part of application No. 13/083,425, filed on Apr. 8, 2011, now Pat. No. 8,997,635, which is a continuation-in-part of application No. 12/592,832, filed on Feb. 25, 2010, now abandoned.

(60) Provisional application No. 61/627,662, filed on Oct. 17, 2011.

(51) Int. Cl.
*A47J 27/62* (2006.01)
*A47J 37/06* (2006.01)
*H05B 1/02* (2006.01)
*A47J 37/07* (2006.01)

(52) U.S. Cl.
CPC .............. *A47J 37/06* (2013.01); *A47J 37/0688* (2013.01); *A47J 37/0718* (2013.01); *H05B 1/0261* (2013.01)

(58) Field of Classification Search
CPC .................. A47K 2010/3266; A47K 10/3818; A47K 10/421; B65D 83/0817; B65D 83/0409; A62C 35/68; A62C 2/00; A62C 37/00; A62C 3/08; A62C 99/0018
USPC ............ 99/323.4, 323.5, 323.9, 323.6, 323.7, 99/323.8, 324, 331; 220/293, 297, 300, 220/301; 169/46, 56, 60, 61, 65, 70; 221/36, 37, 40, 41, 228, 229
See application file for complete search history.

(56) References Cited

U.S. PATENT DOCUMENTS

| | | | | | |
|---|---|---|---|---|---|
| 1,921,173 | A | * | 8/1933 | St Maur | 99/335 |
| 2,426,620 | A | * | 9/1947 | Koci | 337/53 |
| 2,494,373 | A | * | 1/1950 | Young | 99/400 |
| 3,310,201 | A | * | 3/1967 | Guarr et al. | 221/197 |
| 3,425,334 | A | * | 2/1969 | Brown et al. | 126/299 D |
| 3,581,654 | A | * | 6/1971 | Tescula | 99/399 |
| 3,742,838 | A | * | 7/1973 | Luschen et al. | 99/389 |
| 3,820,607 | A | * | 6/1974 | Miley | 169/58 |
| 3,889,757 | A | * | 6/1975 | Dunn | 169/59 |
| 4,085,735 | A | * | 4/1978 | Kaufman et al. | 126/299 E |
| 4,261,257 | A | * | 4/1981 | Henderson et al. | 99/386 |
| 4,346,651 | A | * | 8/1982 | Schickedanz | 99/392 |
| 4,383,157 | A | * | 5/1983 | Nakata et al. | 219/711 |
| 4,438,686 | A | * | 3/1984 | Perez | 99/353 |
| 4,489,853 | A | * | 12/1984 | Korte et al. | 221/187 |
| 4,499,357 | A | * | 2/1985 | Kojima | 219/711 |

(Continued)

*Primary Examiner* — Eric Stapleton
(74) *Attorney, Agent, or Firm* — Michael D. Eisenberg

(57) ABSTRACT

An electric grill for cooking food items comprises: a receptacle for receiving fats and breakaway solids generated during the cooking of the food; and a safety mechanism configured to prevent the grill from operating without at least one movement of the receptacle subsequent to the grill being powered on. Optionally, other safety features include, a fire suppression system, temperatures sensors, proximity sensors for detecting obstructions near the grill, weight sensors, liquid level sensors and infrared photo-interrupter sensors for detecting whether the tray has been removed from the grill, since the grill's last operation.

8 Claims, 22 Drawing Sheets

(56) References Cited

U.S. PATENT DOCUMENTS

| | | | | |
|---|---|---|---|---|
| 4,619,190 A | * | 10/1986 | Smith | 99/393 |
| 4,647,758 A | * | 3/1987 | Kelian | 219/385 |
| 4,819,614 A | * | 4/1989 | Hitch | 126/36 |
| 5,006,355 A | * | 4/1991 | Stuck et al. | 426/243 |
| 5,154,161 A | * | 10/1992 | Rogers et al. | 126/299 D |
| 5,319,171 A | * | 6/1994 | Tazawa | 219/705 |
| 5,430,272 A | * | 7/1995 | Takahashi | 219/497 |
| 5,454,427 A | * | 10/1995 | Westbrooks et al. | 165/267 |
| 5,628,242 A | * | 5/1997 | Higley | 99/332 |
| 5,673,610 A | * | 10/1997 | Stuck | 99/386 |
| 5,718,294 A | * | 2/1998 | Billiard et al. | 169/61 |
| 5,743,054 A | * | 4/1998 | Luchetti et al. | 52/220.7 |
| 5,743,173 A | * | 4/1998 | Hayashi et al. | 99/331 |
| 5,771,959 A | * | 6/1998 | Westbrooks et al. | 165/11.1 |
| 5,823,410 A | * | 10/1998 | Ackeret | 224/281 |
| 6,157,014 A | * | 12/2000 | Goranson | 219/700 |
| 6,315,039 B1 | * | 11/2001 | Westbrooks et al. | 165/201 |
| 6,321,639 B1 | * | 11/2001 | Misceo | 99/332 |
| 6,486,453 B1 | * | 11/2002 | Bales et al. | 219/702 |
| 6,802,367 B1 | * | 10/2004 | Westbrooks et al. | 165/201 |
| 7,217,906 B2 | * | 5/2007 | Veltrop et al. | 219/386 |
| 7,479,006 B2 | * | 1/2009 | Newsom | 431/12 |
| 7,552,673 B2 | * | 6/2009 | Levin | 99/323.3 |
| 7,793,649 B2 | * | 9/2010 | Barkhouse et al. | 126/39 G |
| 7,806,046 B2 | * | 10/2010 | Long et al. | 99/399 |
| 8,610,036 B2 | * | 12/2013 | Ewell et al. | 219/492 |
| 2002/0014484 A1 | * | 2/2002 | Caruso | 219/521 |
| 2003/0106944 A1 | * | 6/2003 | Doppelt | 239/65 |
| 2005/0229918 A1 | * | 10/2005 | Shim | 126/39 BA |
| 2005/0263688 A1 | * | 12/2005 | Kauhanen | 250/231.13 |
| 2010/0132566 A1 | * | 6/2010 | Serra et al. | 99/331 |
| 2010/0188229 A1 | * | 7/2010 | Nhep | 340/573.1 |
| 2011/0174169 A1 | * | 7/2011 | Watanabe et al. | 99/489 |
| 2011/0198344 A1 | * | 8/2011 | Uchiyama | 219/680 |
| 2012/0097662 A1 | * | 4/2012 | Ewell et al. | 219/492 |

* cited by examiner

GRILL WITH SAFETY SYSTEM

CROSS-REFERENCES TO RELATED APPLICATIONS

The present application claims priority from U.S. Provisional Application Ser. No. 61/627,662 filed Oct. 17, 2011 and is a continuation in part of U.S. application Ser. No. 13/083,425 filed Apr. 8, 2011, which is a continuation in part of U.S. application Ser. No. 12/592,832 filed Feb. 25, 2010, and each is hereby incorporated herein by reference in its entirety.

TECHNICAL FIELD

This invention relates to cooking appliances for use in domestic and commercial kitchens. The invention relates particularly to electric grills that can be used to cook food in a way that removes fat from the food that is cooked. In particular the invention relates to a safety systems for an electric grill.

BACKGROUND OF THE INVENTION

The present application addresses the need for additional safety systems in grills to prevent fires from occurring. One way to prevent fires is to clean the drip tray between each use. Methods and systems are provided to encourage this by forcing the user to interact with the tray between each use.

Obesity together with heart disease has been linked to high consumption of saturated fats and cholesterol found in most meat products. The American Heart Association ("AHA") has recommended that individuals should, in order to reduce the risk of heart disease and cancer, reduce their daily intake of saturated fats and cholesterol.

Grills in which the radiant cooking elements and grilling space have been arranged vertically are particularly well adapted to remove fats from meat that is being cooked. As the food is suspended between the cooking elements gravity and pressure of a holding clasp act on liquefied fats and oils such that they drip out of and away from the food being cooked. Vertical grills have been recommended by heart physicians as a suitable device to help patients and the public reduce their intake of saturated fats that would otherwise be ingested with conventionally cooked meats. The vertical radiant heat grilling configuration was much favoured by the public as a real grill over 'grilling' on or frying on flat metal, Teflon or other fire resistant surfaces.

However, there were problems associated with prior art vertical grills. The prior art vertical grill used an internal drip tray to retain fats and oils that drip down from the food being grilled between two radiant cooking elements. Unfortunately, the prior art vertical grill with an internal drip tray is prone to fire flare-ups and smoke.

As a result if the internal drip tray is not cleaned thoroughly before each use to ensure there are no combustible fats or solids present in the tray, there is a good chance that the contents of the tray will combust. Further, users were also recommended to add a small quantity of cold water to the internal drip tray to reduce the volatility of the liquefied fats and oils that accumulated in the tray.

Because the drip tray was internal to the device some people were unaware of the requirement to clean out the drip tray and/or to add water and as a result the device would sometimes catch fire.

As a result of fire risk, some prior art vertical grill designs employed an internal drip tray that features a fire suppressing perforated metal cover. However this design had its drawbacks. First, the perforated cover actually makes it more likely that a user of the device will forget to empty the contents of the drip tray as the retained oils and fats will be mostly obscured by the internal drip tray cover. In such a case where the internal drip tray is hidden from view within the body of the vertical grill, dangerous reserves of retained fats and oils could easily go unobserved. Further, the use of a perforated metal fire suppressing shield resulted in solid spoils and embers from above, coming to rest on the protective fire shield. These solids sometimes blocked the perforations resulting in an accumulation of fats and oils on its surface which, along with the solids themselves, can often result in smouldering embers and ignited fats entering into the internal cavities of the device, and/or cause the fats in the drip tray to ignite despite the presence of the fire suppressing shield. It is a common complaint by users of the vertical grill that a blocked or inappropriately prepared internal drip tray can permit smouldering embers to activate kitchen fire alarms.

It is an object of the present invention to improve on the design of prior art vertical grills and/or to substantially ameliorate some of the shortcomings of the prior art vertical grills.

BRIEF SUMMARY OF EMBODIMENTS OF THE INVENTION (1) In a variant, an electric grill for cooking food items comprises a receptacle for receiving fats and breakaway solids generated during the cooking of the food, and a safety mechanism configured to prevent the grill from operating without at least one movement of the receptacle subsequent to the grill being powered on.

(2) In another variant of the electric grill, the safety mechanism is configured to prevent the grill from operating without at least one movement of the receptacle subsequent to the grill being powered on and powered off.

(3) In a further variant of the electric grill, the safety mechanism comprises a mechanical lock configured to mechanically engage the receptacle prior to the grill being powered off and mechanically disengage the receptacle when the unit is powered off.

(4) In still a further variant of the electric grill, the safety mechanism comprises a first biasing element to urge the receptacle out of the grill. The mechanical lock is configured to lock the receptacle in place while the receptacle is under outward bias by the first biasing element.

(5) In another variant of the electric grill, the safety mechanism comprises a moveable stop configured to hold the receptacle against the biasing element when the receptacle is placed into the grill prior to being powered on.

(6) In a further variant of the electric grill, the safety mechanism comprises a plunger configured to engage the receptacle after the grill is powered on and to hold the receptacle against the force of the biasing element.

(7) In yet another variant of the electric grill, the moveable stop is biased to maintain a position against the receptacle to prevent the receptacle from moving under the influence of the first biasing element.

(8) In still a further variant of the electric grill, the first biasing element is a spring.

(9) In another variant of the electric grill, the safety mechanism comprises a mechanical lock configured to mechanically engage the receptacle prior to the grill being powered off and mechanically disengage the receptacle when the unit is powered off. The mechanical lock comprises: a power on off switch; a plunger connected to the power on off switch; a spring configured to urge the receptacle out of the grill; a moveable stop disposed below the plunger and the moveable stop being biased upward toward the plunger, and configured to hold the receptacle against the spring; and a port in the receptacle, configured to receive the plunger, and the port disposed above the moveable stop, wherein when the power switch is placed in an on position, the plunger is pushed through the port, and is configured to push the moveable stop down to disengage the stop from holding the receptacle back against the urging of the spring.

(10) In a further variant of the electric grill, a side of the port is configured to abut the plunger when the plunger is pushed through the port, and is pressing down on the stop to move the stop away from the receptacle and the receptacle being released under the bias of the spring. Ejection of the receptacle from the grill is prevented while the plunger is through the port.

(11) In still another variant of the electric grill, the safety mechanism comprises a mechanical lock configured to mechanically engage the receptacle. The mechanical lock comprises: a ridge disposed on the receptacle; and a moveable stop configured to engage the ridge, and having slope to guide the ridge over the moveable stop when the receptacle is placed into the grill into its docked position.

(12) In yet a further variant of the electric grill, the safety mechanism comprises an infrared photo-interrupter sensor having an emitter and a receiver, configured with the grill such that when the receptacle is either removed or properly docked into the grill, the status of the photo-interrupter sensor is changed.

(13) In a variant of the electric grill, the safety mechanism comprises a proximity sensor configured to detect a change in position of the receptacle, wherein the receptacle in its docked position with the grill comprises a first state of the sensor and any position where the grill is not docked comprises a second state of the sensor. The grill is configured to preclude operation of the grill until the state of sensor has changed at least once after the most recent occurrence of the grill being powered off.

(14) In another variant of the electric grill, an electric grill for cooking food items comprises: a receptacle for receiving fats and breakaway solids generated during the cooking of the food; and a safety mechanism configured to prevent a fire in the unit.

(15) In a further variant of the electric grill, the safety mechanism comprises a weight sensor disposed below the receptacle configured to output a signal based on the weight of the receptacle. The grill is configured to power off if the weight of the receptacle reaches a predetermined threshold amount.

(16) In still another variant of the electric grill, the safety mechanism comprises a liquid level sensor configured to measure the level of liquid in the receptacle.

(17) In yet a further variant of the electric grill, the safety mechanism comprises a temperature sensor configured to measure the temperature inside the receptacle. The grill is configured to power off when the temperature sensor measures above a predetermined temperature.

(18) In a variant of the electric grill, the safety mechanism comprises a proximity sensor configured to detect an obstruction above an opening of the grill. The grill is configured to power down or is precluded from powering on if the proximity sensor detects an obstruction within a predetermined distance from the opening.

(19) In a further variant of the electric grill, the safety mechanism comprises a fire suppression system configured to activate if the temperature of the grill reaches a predetermined temperature.

(20) In another variant, a method of ensuring safe operation of an electric grill having drip tray comprises: powering off the grill; detecting that the grill has been powered off; precluding the grill from being powered on subsequent to being powered off, without the drip tray first being moved from its docked position within the grill.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
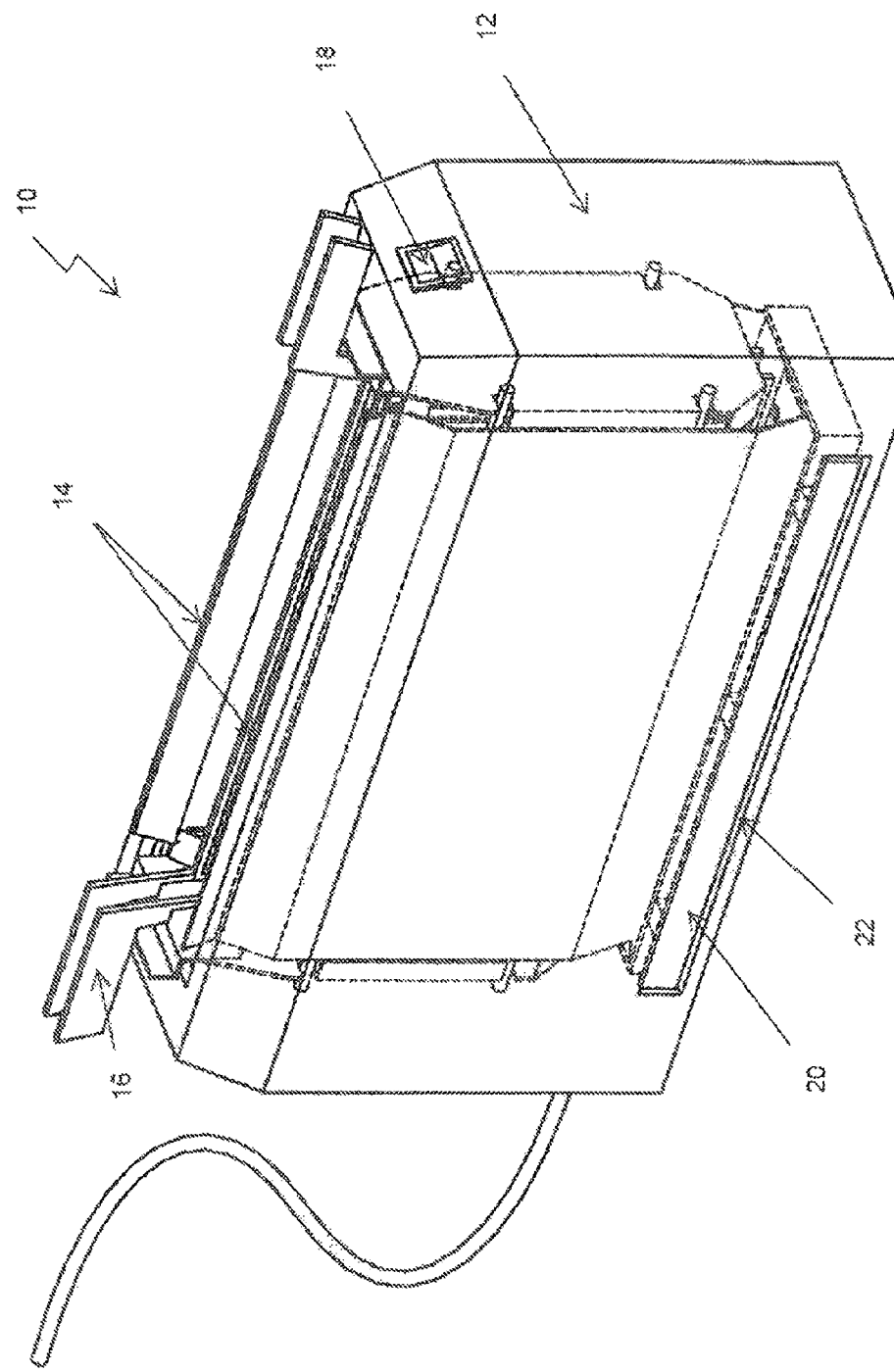
FIG. 1 is a perspective view of a prior art electric grill in which the internal drip tray is in place within the body of the electric grill.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

A first aspect of the invention comprises an electric grill for cooking food items, wherein the electric grill is comprised of a body containing at least one vertical grilling area disposed between at least two sources of radiant heat energy, and wherein the body is adapted to direct fats and breakaway solids generated during the cooking of the food away from the cooking element down through the body of the electric grill and out into an external receptacle.

Preferably the body is adapted to direct fats and breakaway solids generated during cooking to an external drip tray by means of one or more slides that define a path to the external receptacle via an external opening formed in the body.

A first embodiment of the first aspect of the invention provides a electric grill with a body containing at least two slides that are disposed between sides of the body and the at least two sources of radiant heat, wherein the slides direct fats and breakaway solids generated during cooking to an external receptacle via the external opening.

Still more preferably the two slides are disposed in a y shaped assembly wherein the lower end of the longer slide in the y shaped assembly terminates near the external opening.

A second embodiment of the first aspect of the invention provides a electric grill with a body containing one vertical grilling area and a single angled slide which is disposed below the grilling area and is pitched at an angle sufficient to direct fats and breakaway solids that drop down upon it to an external receptacle via the external opening.

Preferably the angled slide is planar and is adapted to be inserted and removed from the body of the vertical grill.

Still more preferably, the angled slide is adapted to be inserted from an upper portion of the side of the electric grill that is opposite the side that has the external opening.

Alternatively, in a third embodiment of the first aspect of the invention, the angled slide of the second embodiment is adapted to be inserted and removed from the body via the external opening.

In a fourth embodiment of the first aspect of the invention, an electric grill with a body that has one vertical grilling area and wherein the one or more slides is comprised of a wedge inserted into the body so that it is situated below the one vertical grilling area and wherein a top surface of the wedge is pitched at an angle sufficient to direct fats and breakaway solids generated during the cooking of the food that drop down upon it to an external receptacle via the external opening.

In a fifth embodiment of the first aspect of the invention there is provided a electric grill with a body in which there are two vertical grilling areas disposed between at least three sources of radiant heat, such that there is at least a source of radiant heat on each side of each vertical grilling area and wherein the body of the electric grill is adapted to direct fats and breakaway solids generated during the cooking of the food away from the cooking element down through the vertical grill and out into an external receptacle.

Preferably the body is adapted to direct fats and breakaway solids generated during the cooking of the food away from the cooking element down through the vertical grill and out into an external receptacle by the inclusion of slide means which direct and/or guide splattered fats to the external receptacle from a position within the body.

Preferably the slide means comprises a single angled slide which is disposed below the grilling areas and is pitched at an angle sufficient to direct fats and breakaway solids generated during the cooking of the food that drop down upon it to the external receptacle via the external opening.

Still more preferably the single angled slide is introduced via a slot formed in the side of the body which is opposite to the side of the body which has the external opening.

Preferably, with respect of all of the embodiments of the invention, the external receptacle is adapted to engage with the external opening.

More preferably the external receptacle may be covered or partially covered by a protective hood.

Preferably the protective hood is connected to the grill and is also semi transparent.

Still more preferably with respect to all of the embodiments of the first aspect of the invention, the electric grill has a timer.

Figure 2:
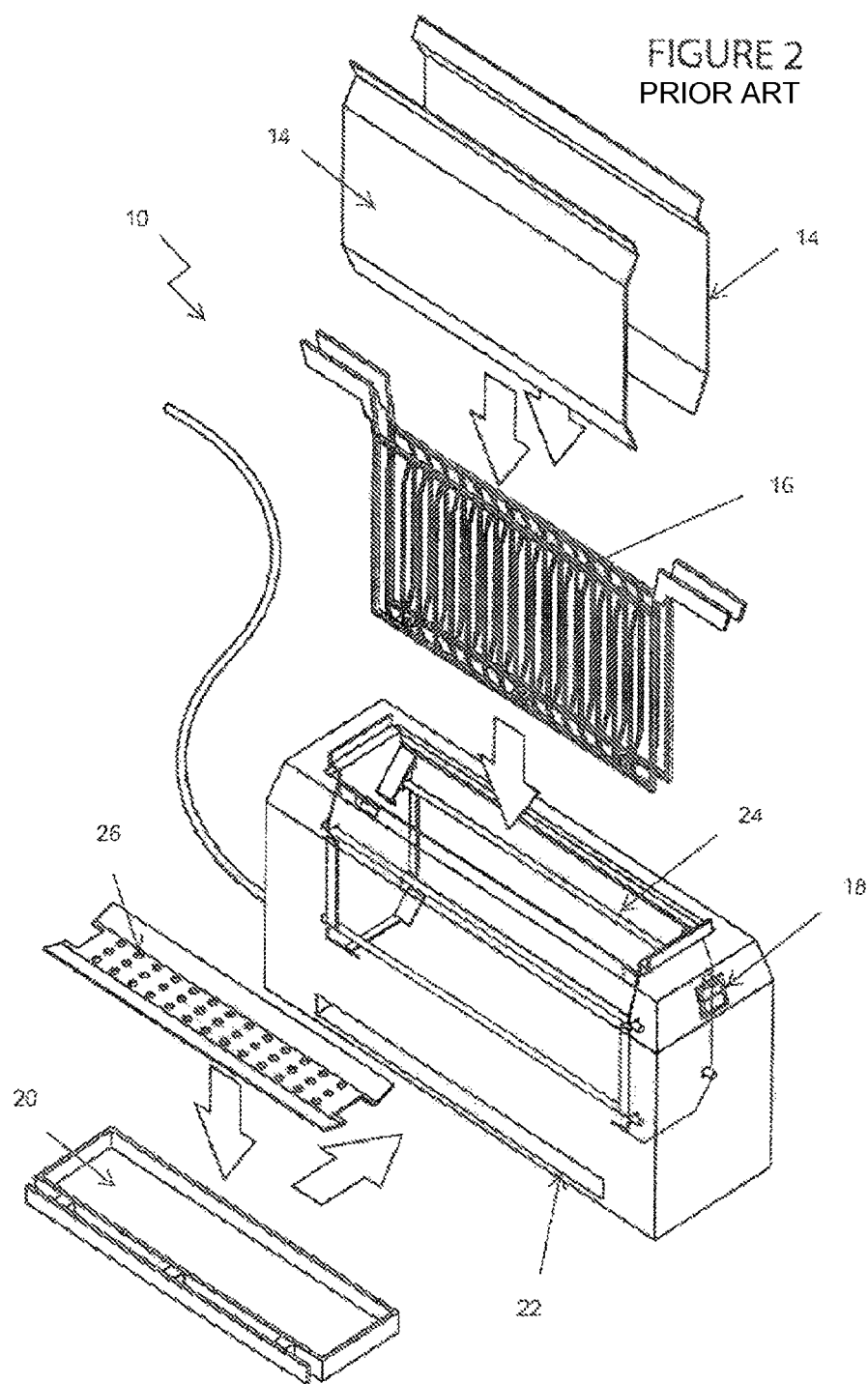
FIG. 2 is an exploded perspective view of a prior art electric vertical grill.

Referring to FIGS. 1 and 2, these figures depict a prior art vertical electric grill 10 in which the following components are visible:

12: body
14: heat reflector and splatter shields
16: food clasp handle/grill
18: power switch
20: internal drip tray
22: external opening
24: cooking element
26: perforated cover The prior art vertical grill 10 had the major disadvantage of collecting splattered fat and bits of food directly under the cooking area of the grill, either in the internal drip tray 20, or just above the perforated cover 26. These areas are subject to high radiant heat and high temperatures and as a result, the contents of the internal drip tray 20 or the food and fat that may sit on the perforated cover 26, may catch fire or generate large amounts of smoke.

A potential solution provided herein to ameliorate the above stated problem involves providing a electric grill in which the fats and breakaway solids are channeled to a receptacle or drip tray that sits outside of the body of the grill, away from high heats.

Figure 3:
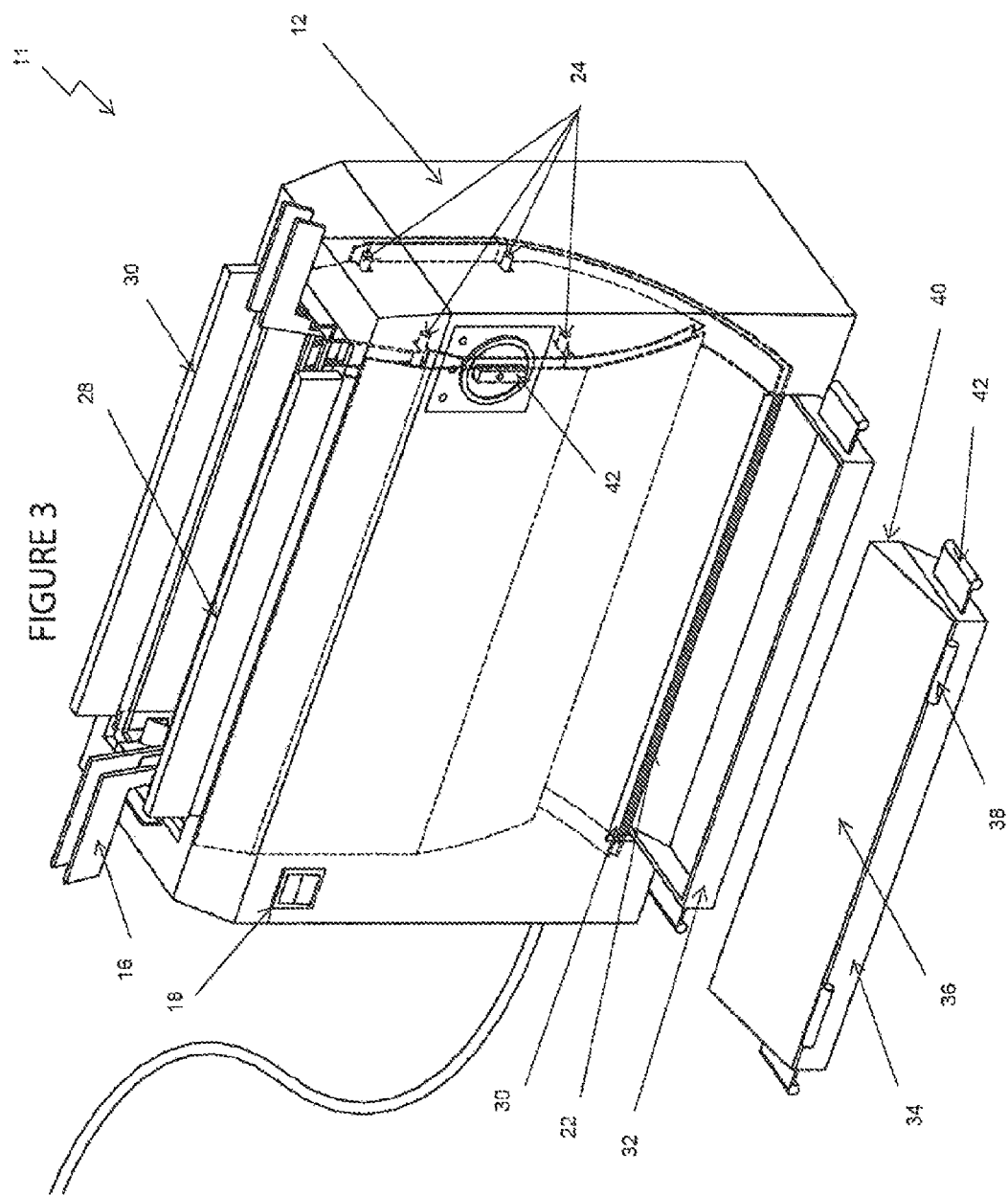
FIG. 3 is a perspective view of a first embodiment of a first aspect of the invention.
Figure 4:
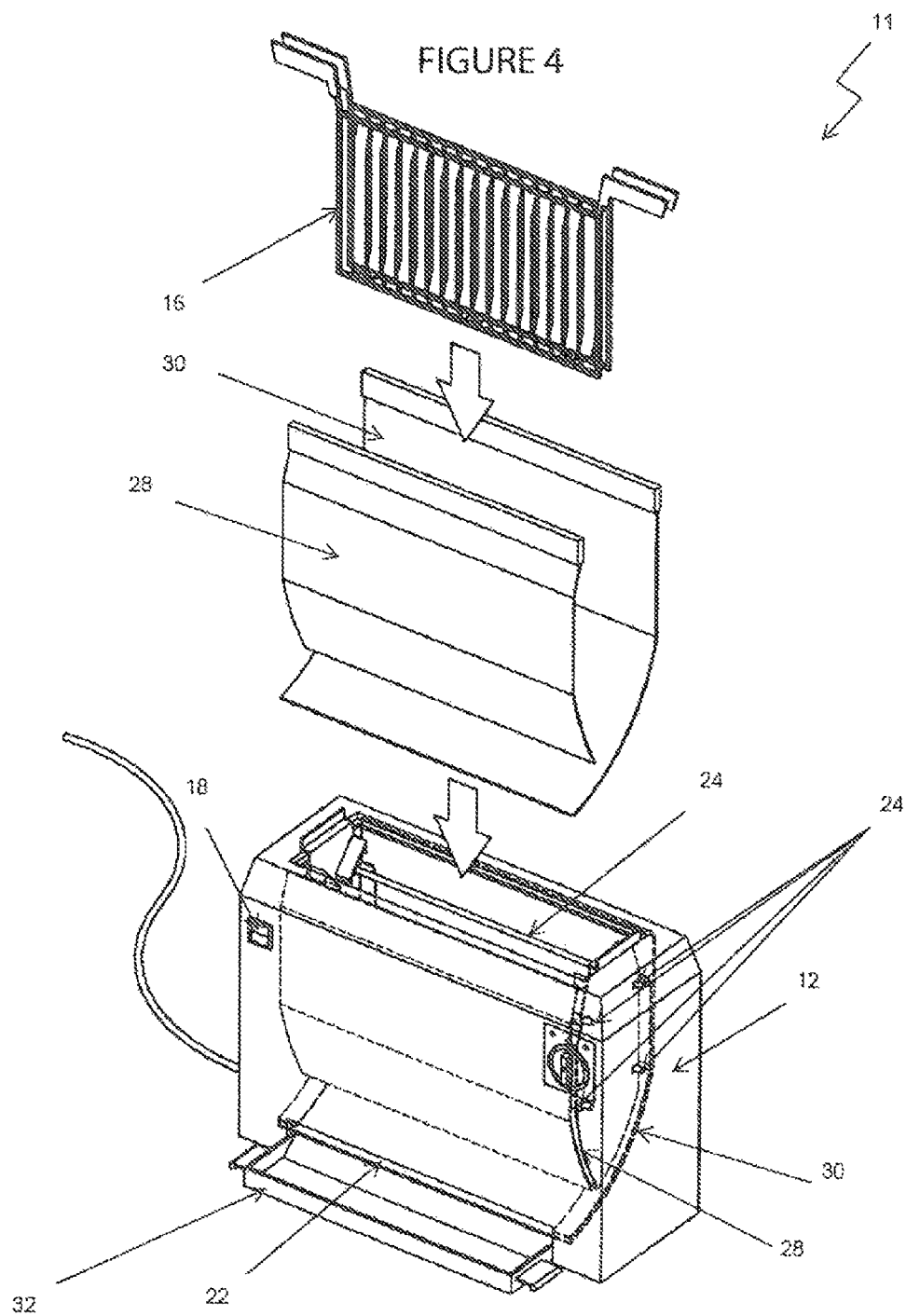
FIG. 4 is an exploded perspective view of the first embodiment of the first aspect of the invention.

The first embodiment of the invention is shown in FIGS. 3 and 4. In this embodiment the two heat reflector and splatter shields 14 of FIGS. 1 and 2 have been replaced by multi-purpose evacuation slides 28 and 30. Evacuation slide 30 is longer and larger than evacuation slide 28. The evacuation slides 30 are inserted into the space between the side walls of the body 12 and the cooking elements 24. Evacuation slides 28 and 30 are also arranged in a y shaped assembly such that any splattered fat collected on evacuation slide 28 drops off the lower end of evacuation slide 28 onto evacuation slide 30 which then delivers it to the external opening 22 for collection into the external receptacle or drip tray 32. The external drip tray 32 is adapted to have a small portion attach to or ride against the external opening 22. When inserted, food and fats that fall onto either of the evacuation slides 28 or 30 exit the external opening 22 and are received into the open top of the external drip tray 32. Grips 42 provide for the ability to handle the hot fats safely whilst at the same time, providing a stop mechanism to prevent the external drip tray 32 from being over inserted into the external opening 22. Grips 42 can also be adapted to engage external opening 22 by way of a mechanism, magnets or other means which allow the external drip tray 32 to remain in close association with the body 12 whilst remaining easily removable.

A hooded external drip tray 34 is shown in FIG. 3. This hooded external drip tray 34 is similar to external drip tray 32 except that it may have a tinted and transparent hood 36 which covers the top of the tray so as to prevent users from touching the hot contents. The hood 36 is pivotally connected to the tray base 34 via hinges 38 and features an aperture at the front of the hood 40 that communicates with the external opening 22 so that fats and food can enter the tray for collection. The hooded external drip tray 34 may be used wherever the external drip tray 32 is shown with respect to all of the embodiments of the invention. As an alternative (not shown) an external drip tray 32 can be used with a grill body that has a connected hood which covers the external drip tray 32.

Figure 5:
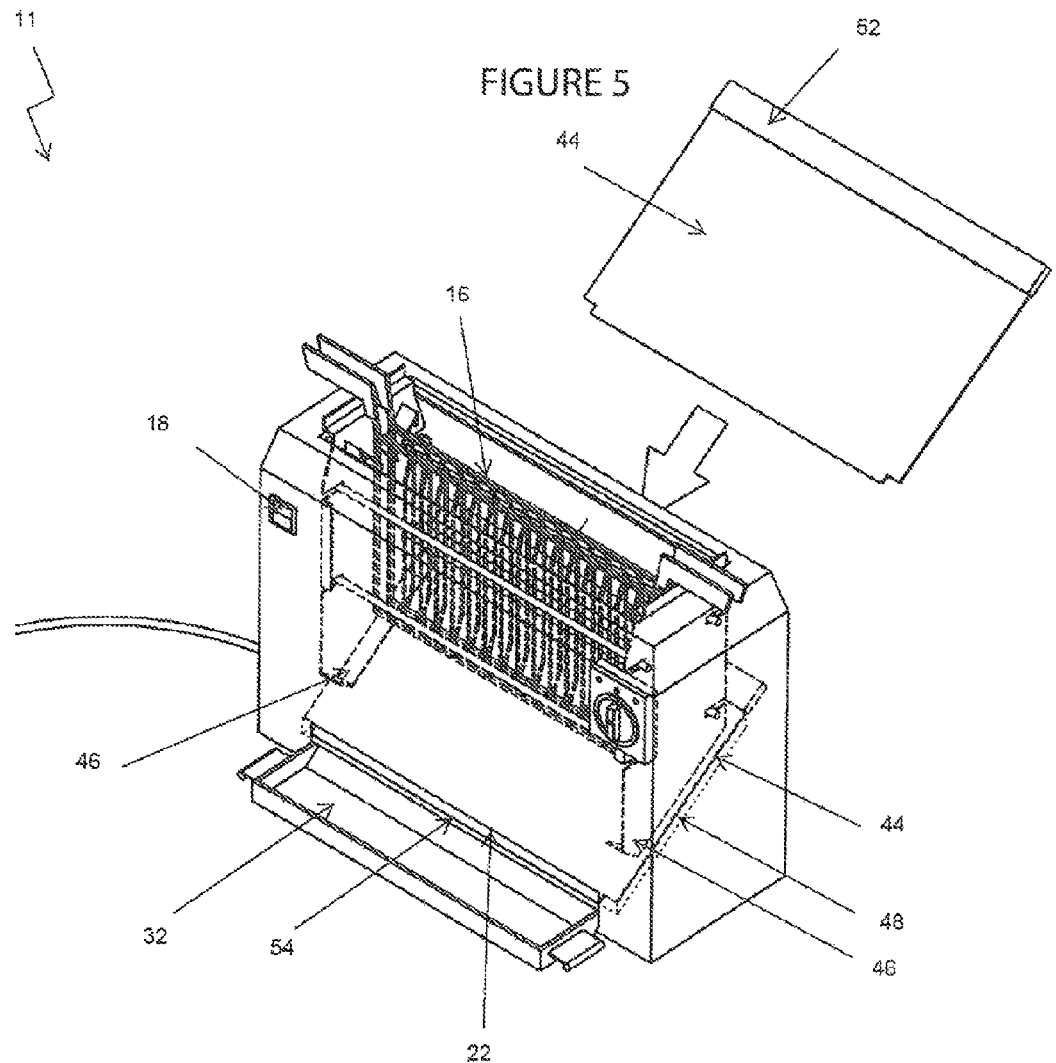
FIG. 5 is a partially exploded front perspective view of a second embodiment of the first aspect of the invention.
Figure 6:
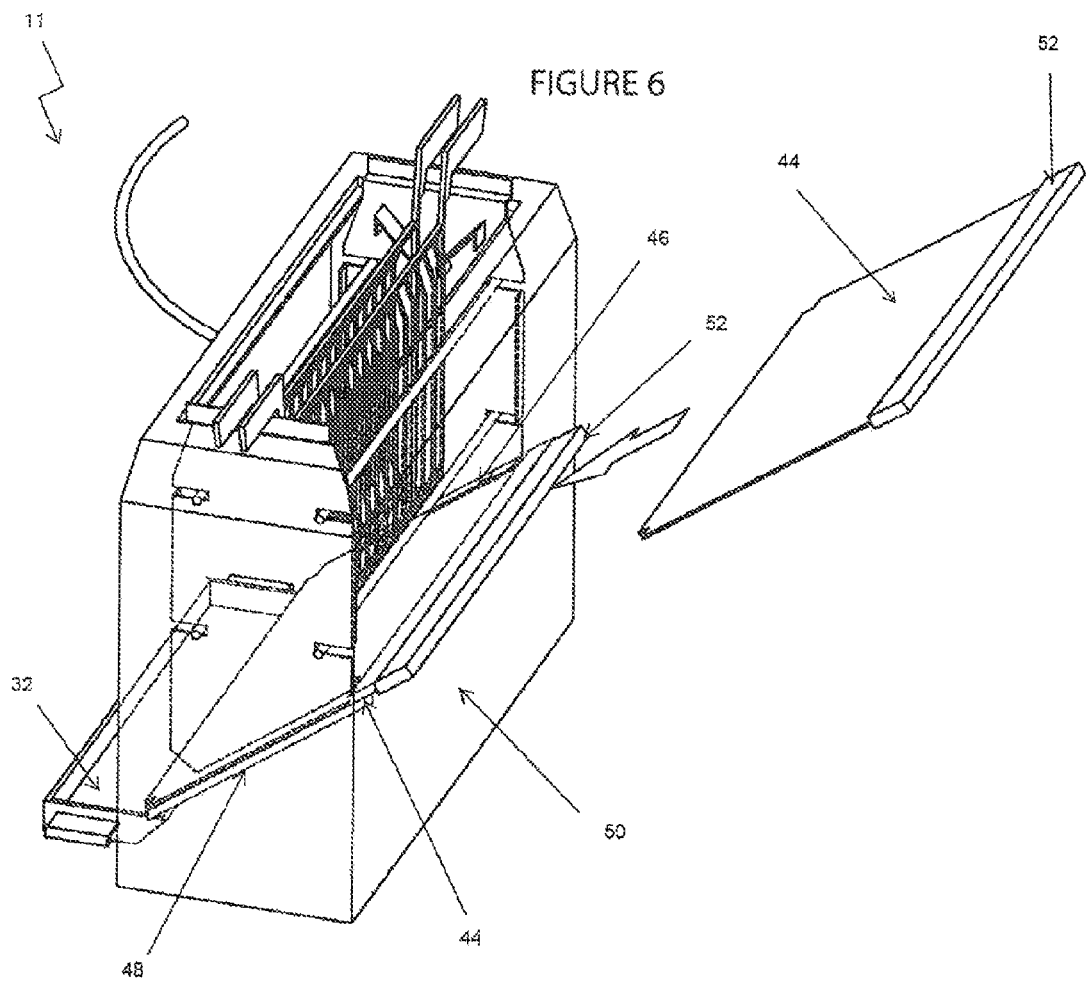
FIG. 6 is a partially exploded rear perspective view of the second embodiment of the first aspect of the invention.

Depicted in FIGS. 5 and 6 is a second embodiment of the invention. In this embodiment the two slides 28 and 30 from FIGS. 3 and 4 are replaced with flat slide 44 incorporating handle 52. This slide 44 is inserted at an angle into the rear side of the body 12 of the vertical grill 11 which is opposite the side of the body 12 which has the external opening 22.

The flat slide 44 is inserted between base element 48 and top guides 46 and comes to rest such that its lower edge 54 sits slightly higher than the top edge of external drip tray 32 so that food and fats that fall on the flat slide 44 fall into the external drip tray 32 where they are not subjected to high heat and accordingly will not catch fire.

Figure 11:
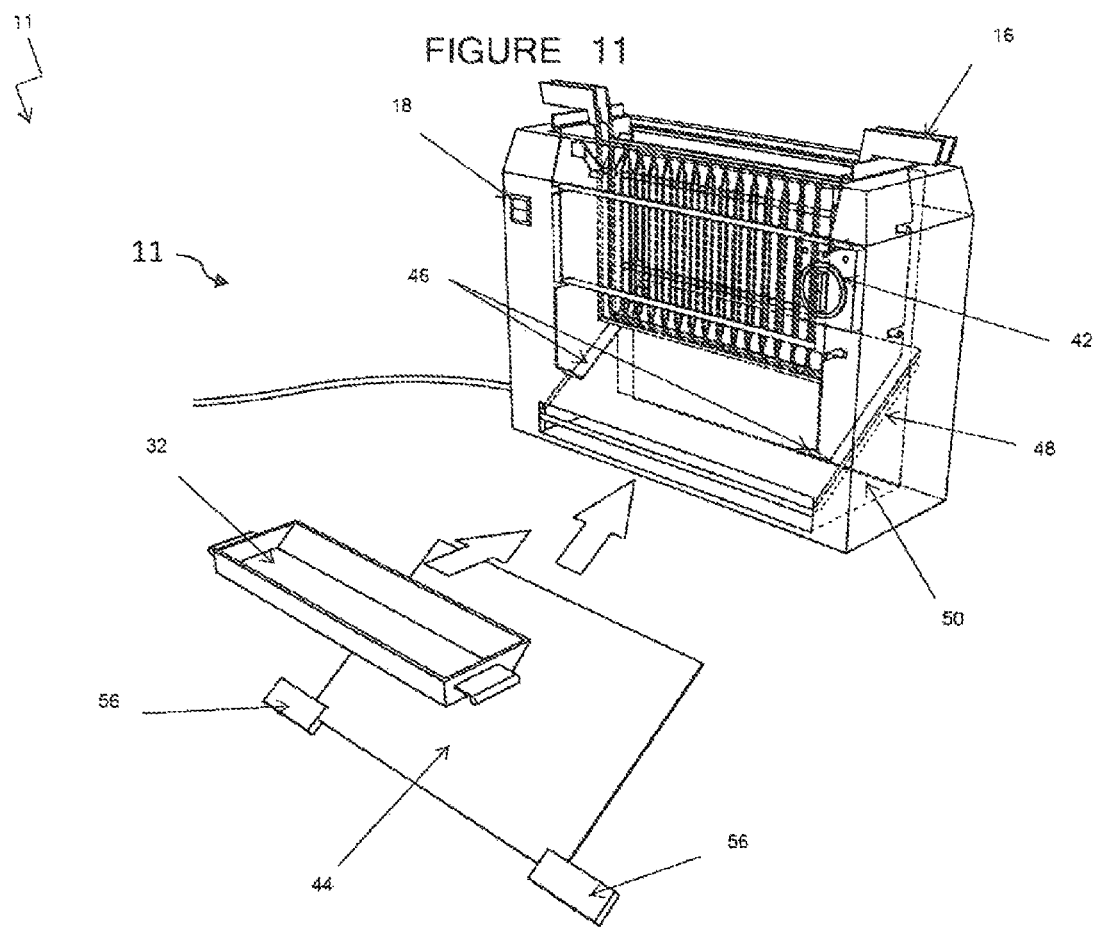
FIG. 11 is a perspective view of a third embodiment of the first aspect of the invention.

A third embodiment depicted in FIG. 11 is very similar to the second embodiment depicted in FIGS. 5 and 6. The substantial difference between them is that the flat slide 44 has a pair of split handles to facilitate its insertion up into the body 12 of the vertical grill 11 where it sits between base 48 and top guides 46.

Figure 7:
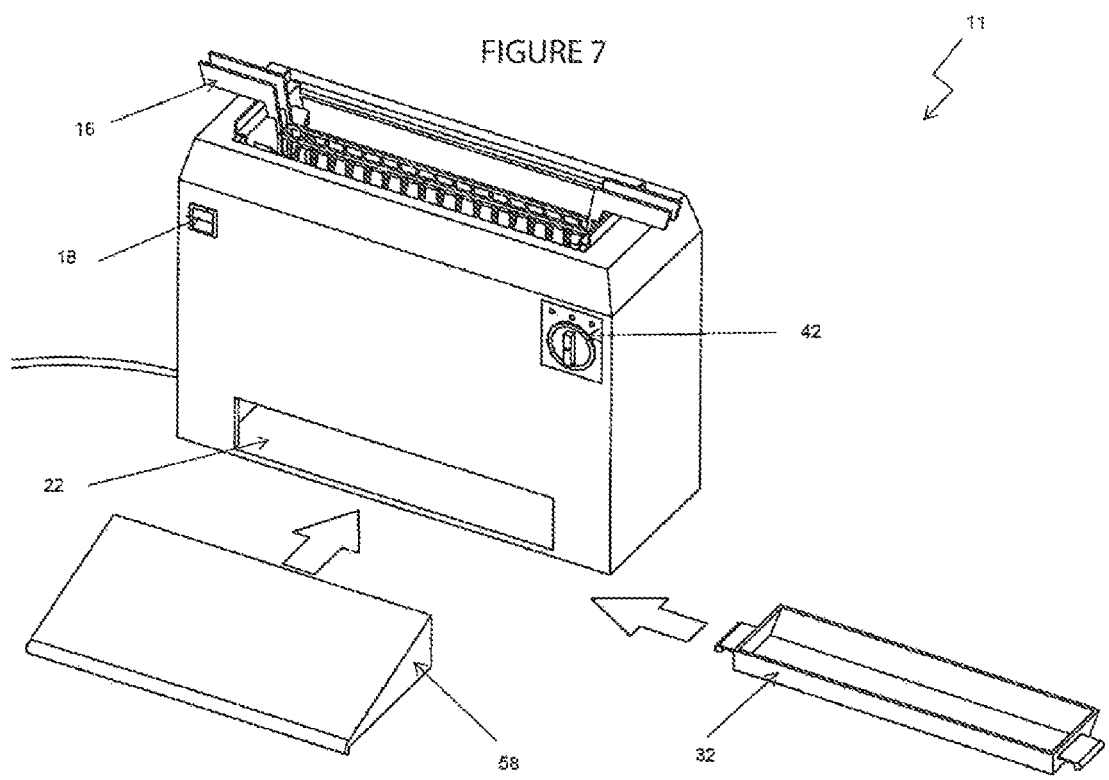
FIG. 7 is an exploded perspective view of a fourth embodiment of the first aspect of the invention.

A fourth embodiment depicted in FIG. 7 is similar to the third embodiment depicted in FIGS. 5 and 6 in that the flat slide 44 is replaced with a pitched wedge 58 which is inserted into the external opening 22. After insertion into the body 12 of the vertical grill 11, a portion of the external drip tray 32 is inserted into the external opening 22 so that it receives all of the food and fat collected on the surface of pitched wedge 58.

Figure 8:
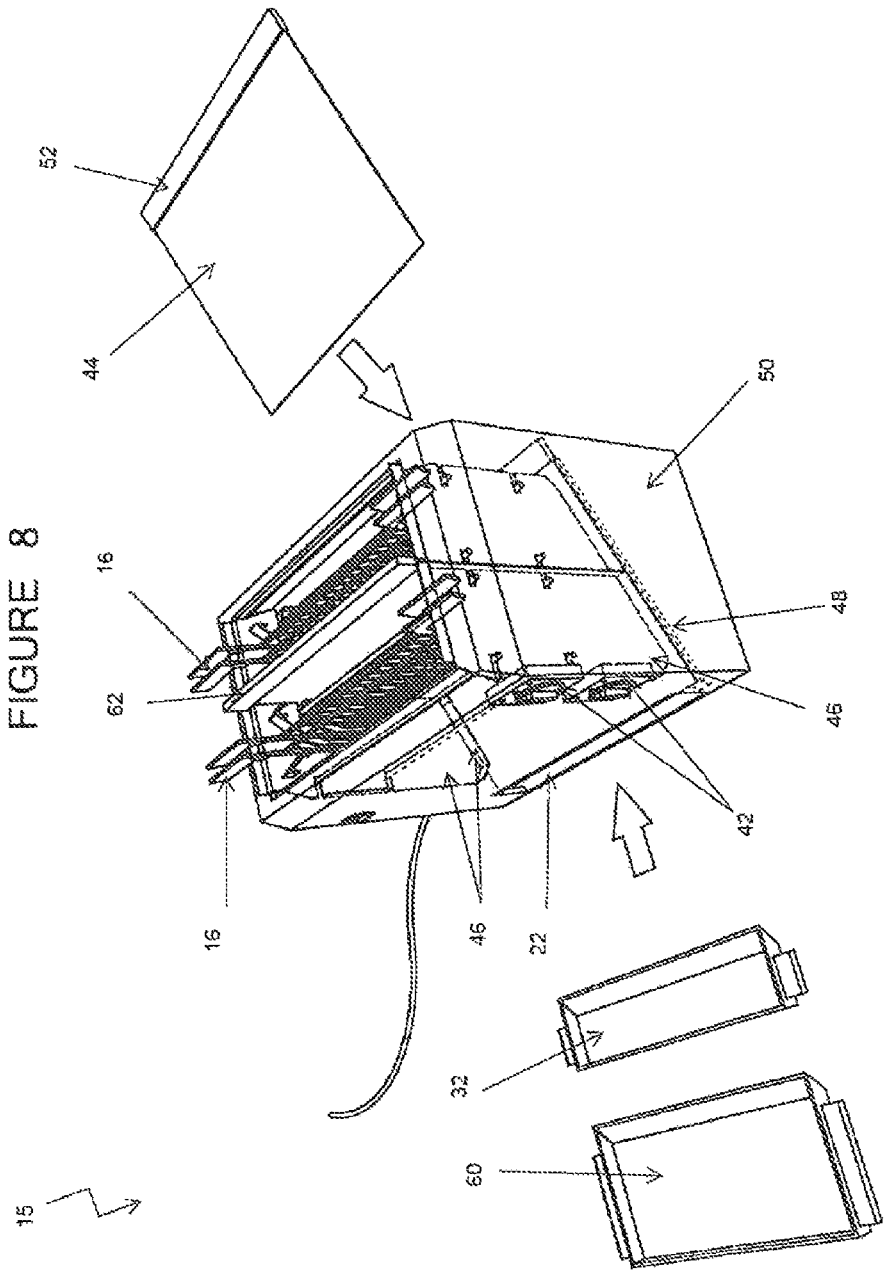
FIG. 8 is an exploded perspective view of a fifth embodiment of the first aspect of the invention.
Figure 9:
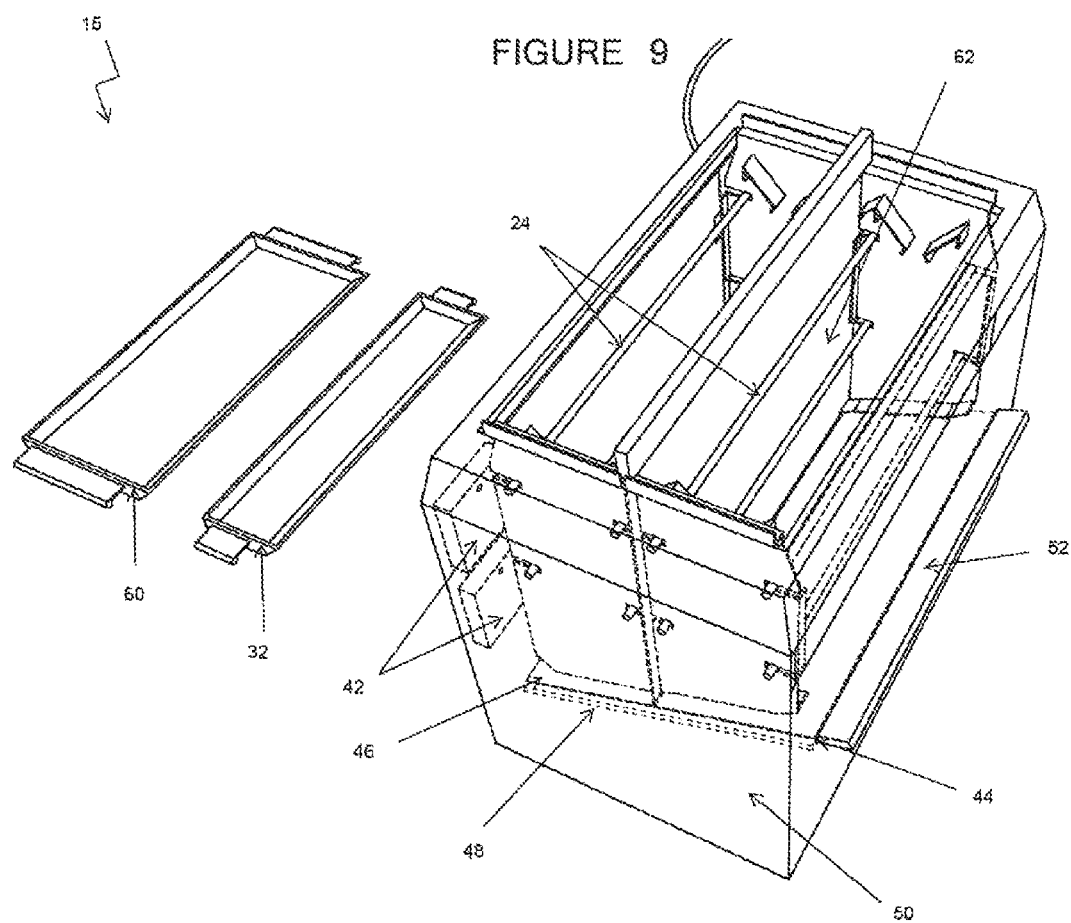
FIG. 9 is a close up view of the grill according to the fifth embodiment according to the first aspect of the invention.
Figure 10:
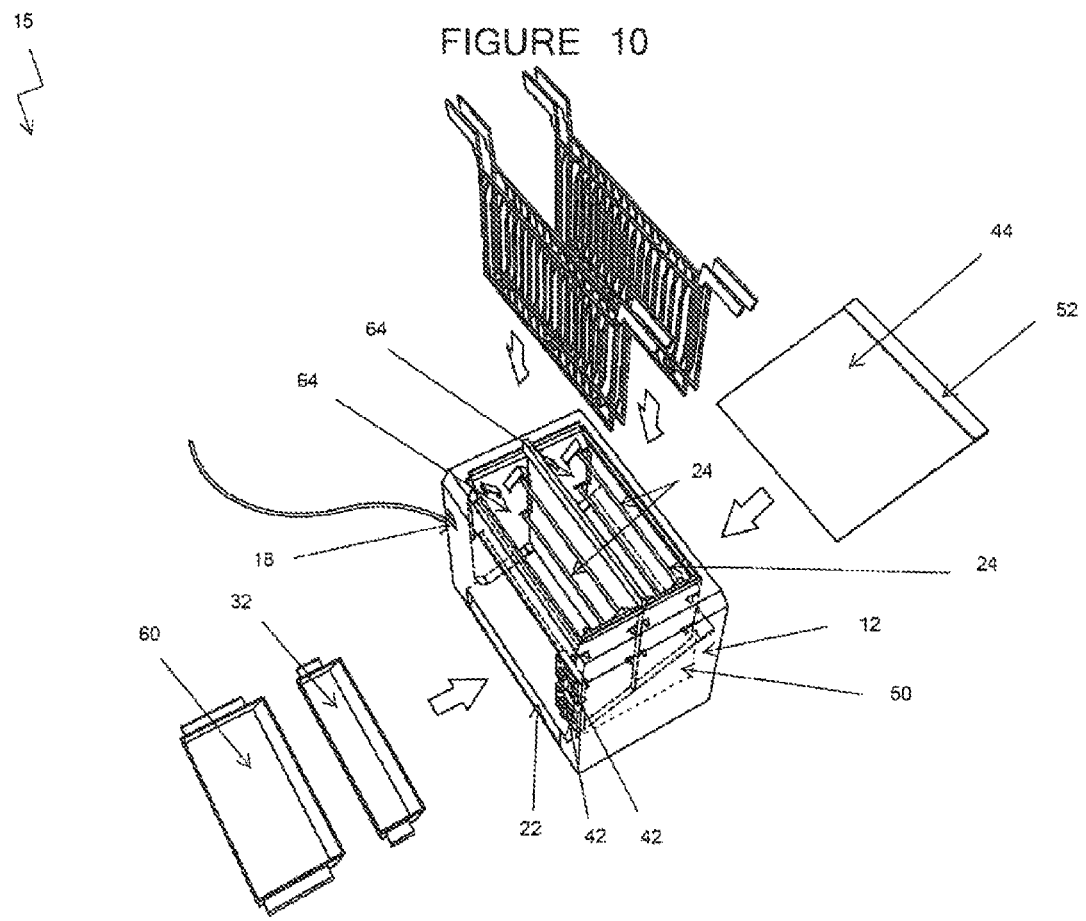
FIG. 10 is a further exploded perspective view of the fifth embodiment of the first aspect of the invention.

A fifth aspect of the invention depicted in FIGS. 8-10 comprises a electric grill 15 with a body 12 featuring two vertical grilling areas 64 divided by a removable reflector/splatter screen 62. Besides the oversized external drip tray 60 which can be used when both grilling areas are being used at the same time, the arrangements of base 48, flat slide 44, top guides 46 and external opening 22 are the same as the invention depicted in FIGS. 5 and 6. The electric grill 15 has at least 3 sets of cooking elements 24 (with one central, common cooking element 24), however the preference is for there to be 4 sources of radiant energy, with one set of cooking elements 24 on each side of each cooking area.

In a sixth embodiment of the invention (not shown), the single flat slide which is installed at an angle is replaced with an inverted V shape slide which is centered under the removable reflector/splatter shield 62 such that each of the vertical grilling areas 64 sits over an angled portion of the inverted V slide, wherein the angled portion delivers splattered fats and breakaway solids to two external drip trays which are located at either side of the vertical grill. In this embodiment the inverted V slide is formed in one piece and is inserted and removed via one of the short sides via a V shaped slot formed in the short sides of the grill. Alternatively, the inverted V slide may be formed by introducing two flat slides into the body of the vertical grill, through one or more sides, including the ends and the longer front or back sides. In this embodiment top guides and base elements may be used to guide the individual flat slides into place where they form the inverted V structure when both are inserted.

All of the embodiments described feature a power switch 18 and at least one separate timer knob 42. The heat emitted by the elements 24 may be controlled with a rheostat or other similar component. The second, third, fourth and fifth embodiments also feature space 50 for a cord storage area if desired, through the installation of a door, aperture, recess or compartment (not shown).

Grill With Safety System

The following variants discuss applications of various safety systems which are applicable to electrical grills with internal or external drip trays. Various systems are provided to prevent the grill from being operated, without the drip tray first being removed from the grill. This action encourages users to clean the tray to reduce the likelihood of fire.

Optionally, other safety features include, a fire suppression system, temperatures sensors, proximity sensors for detecting obstructions near the grill, weight sensors, liquid level sensors and infrared photo-interrupter sensors for detecting whether the tray has been removed from the grill, since the grill's last operation.

Figure 12:
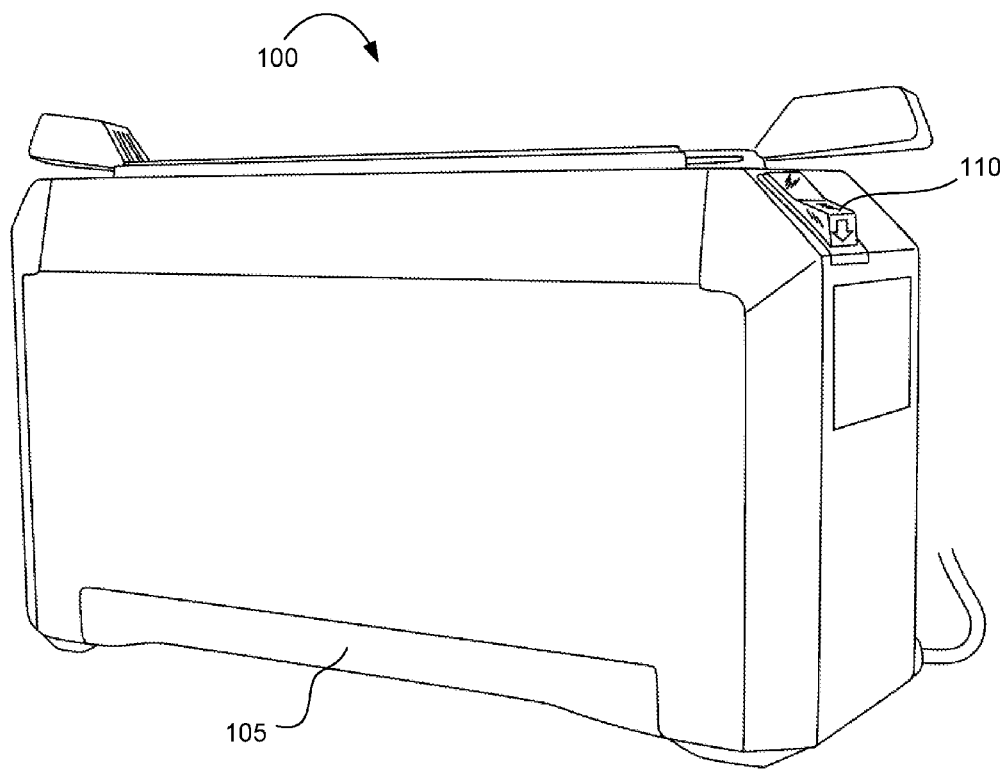
FIG. 12 is a perspective view of a grill.
Figure 13:
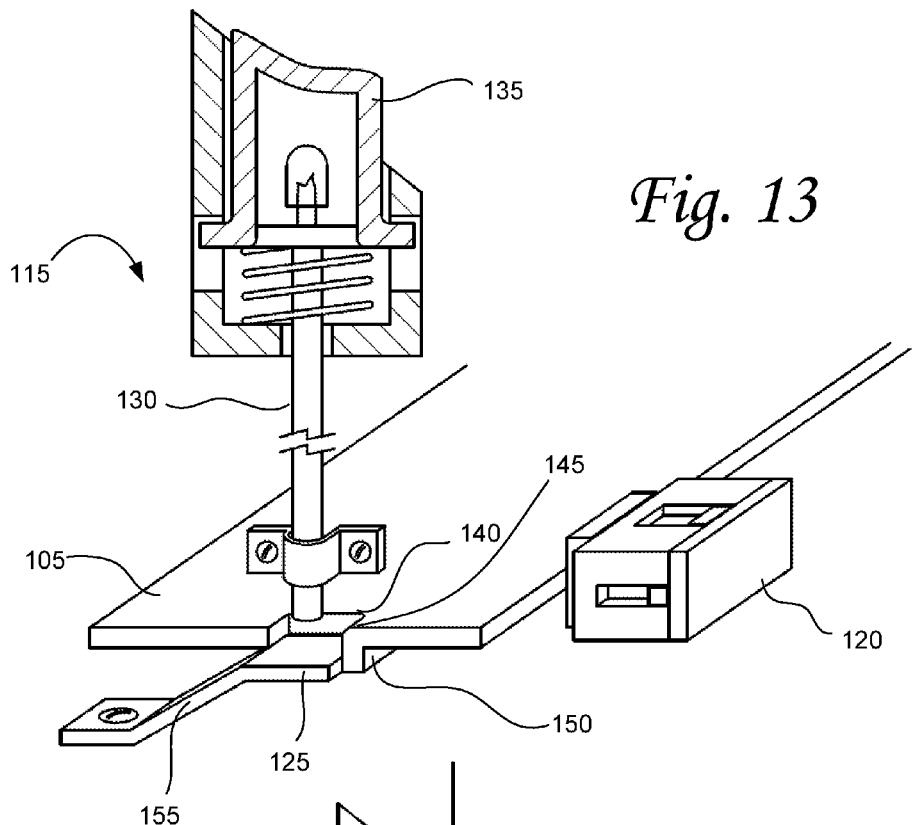
FIG. 13 is a diagram of a grill having a mechanical safety system.
Figure 14:
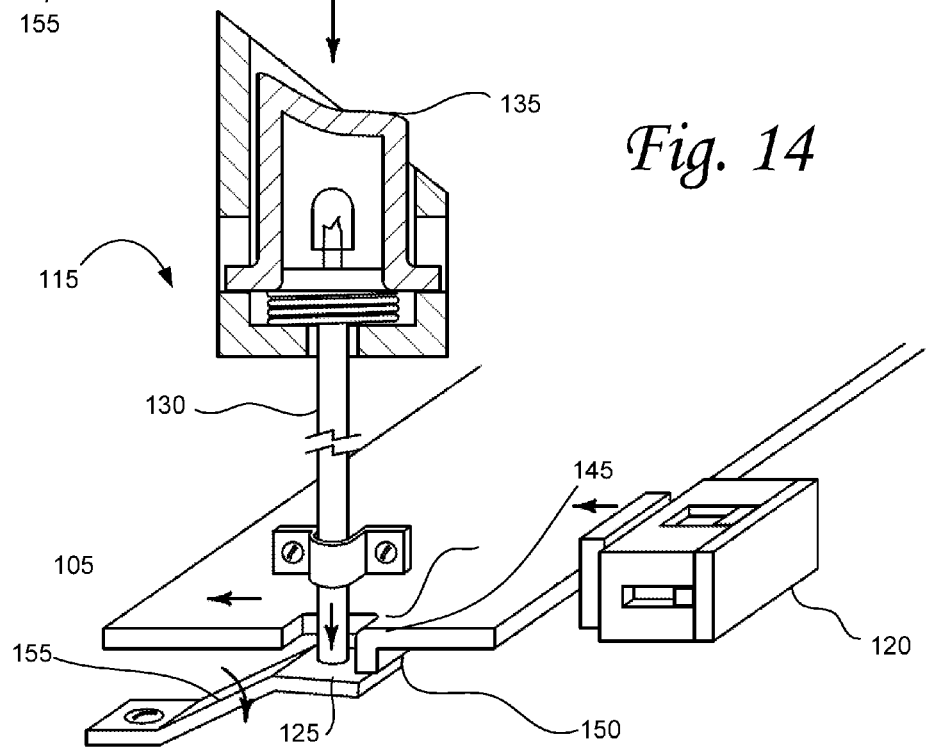
FIG. 14 is a diagram of a grill having a mechanical safety system.

(1) In a variant, referring to FIGS. 12-14, an electric grill 100 for cooking food items having a safety system in accordance with one or more aspects of the present invention, comprises a receptacle 105 for receiving fats and breakaway solids generated during the cooking of the food, and a safety mechanism configured to prevent the grill from operating without at least one movement of the receptacle 105 subsequent to the grill being powered on. The grill may be powered on and off via an on off switch 110.

(2) In another variant of the electric grill, the safety mechanism is configured to prevent the grill from operating without at least one movement of the receptacle subsequent to the grill being powered on and powered off.

(3) In a further variant of the electric grill, referring to FIGS. 13 and 14 the safety mechanism comprises a mechanical lock 115 configured to mechanically engage the receptacle 105 prior to the grill being powered off and mechanically disengage the receptacle when the unit is powered off.

(4) In yet another variant of the electric grill, the safety mechanism comprises a first biasing element 120 configured to urge the receptacle 105 out of the grill. Referring to FIG. 14, the mechanical lock 115 is configured to lock the receptacle in place while the receptacle is under bias from the first biasing element 120.

(5) In another variant of the electric grill, the safety mechanism comprises a moveable stop 125 configured to hold the receptacle 105 against the biasing element 120 when the receptacle is placed into the grill prior to being powered on.

(6) In a further variant of the electric grill, the safety mechanism comprises a plunger 130 configured to engage the receptacle 105 after the grill is powered on and to hold the receptacle against the force of the biasing element 120.

(7) In yet another variant of the electric grill, the moveable stop 125 is biased to maintain a position against the receptacle 105 to prevent the receptacle from moving under the influence of the first biasing element 120.

(8) In still a further variant of the electric grill, the first biasing element is a spring 120. Optionally, the spring is housed in a spring box.

(9) In another variant of the electric grill, referring to FIGS. 13-14, the safety mechanism comprises a mechanical lock configured to mechanically engage the receptacle 105 prior to the grill being powered off and mechanically disengage the receptacle when the grill is powered off. The mechanical lock comprises: a power on off switch 135; a plunger 130 connected to the power on off switch; a spring 120 configured to urge the receptacle out of the grill; a moveable stop 125 disposed below the plunger 130 and the moveable stop 125 being biased upward toward the plunger 130, and configured to hold the receptacle 105 against the spring 120; and a port 140 in the receptacle, configured to receive the plunger 130. The port 140 is disposed above the moveable stop 125. When the power switch 135 is placed in an on position, the plunger 130 is pushed through the port 140, and pushes the moveable stop 125 down to disengage the stop 125 from holding the receptacle 105 back against the urging of the spring 120.

(10) In a further variant of the electric grill, a side 145 of the port 140 is configured to abut the plunger 130 when the plunger is pushed through the port 140, and is pressing down on the stop 125 to move the stop away from the receptacle 105, and thus releasing the receptacle and allowing it to move under the bias of the spring 120 until it abuts the plunger 130. Ejection of the receptacle 105 from the grill 100 is prevented while the plunger is through the port 140.

(11) In still another variant of the electric grill, the safety mechanism comprises a mechanical lock configured to mechanically engage the receptacle. The mechanical lock comprises: a ridge 150 disposed on the receptacle and the moveable stop 125 configured to engage the ridge. The ridge has a slope 155 to guide the ridge over the moveable stop when the receptacle is placed into the grill into its docked position.

Figure 15:
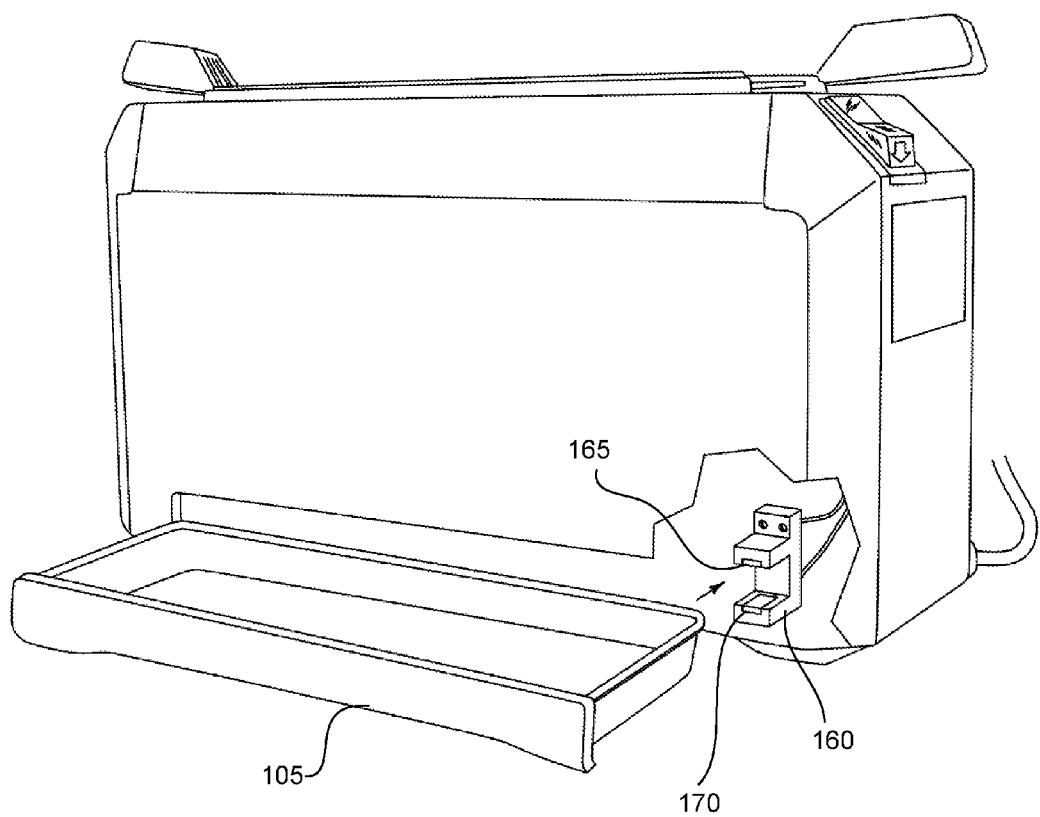
FIG. 15 is a perspective view of a grill having a safety system based on a infrared photo-interrupter sensor.

(12) In yet a further variant of the electric grill, referring to FIG. 15, the safety mechanism comprises an infrared photo-interrupter sensor 160 having an emitter 165 and a receiver 170, configured with the grill such that when the receptacle is either removed or properly docked into the grill, the status of the photo-interrupter sensor is changed, by virtue of the receptacle 105 either blocking or unblocking the path of the light from the emitter 165 to the receiver 170.

Figure 16:
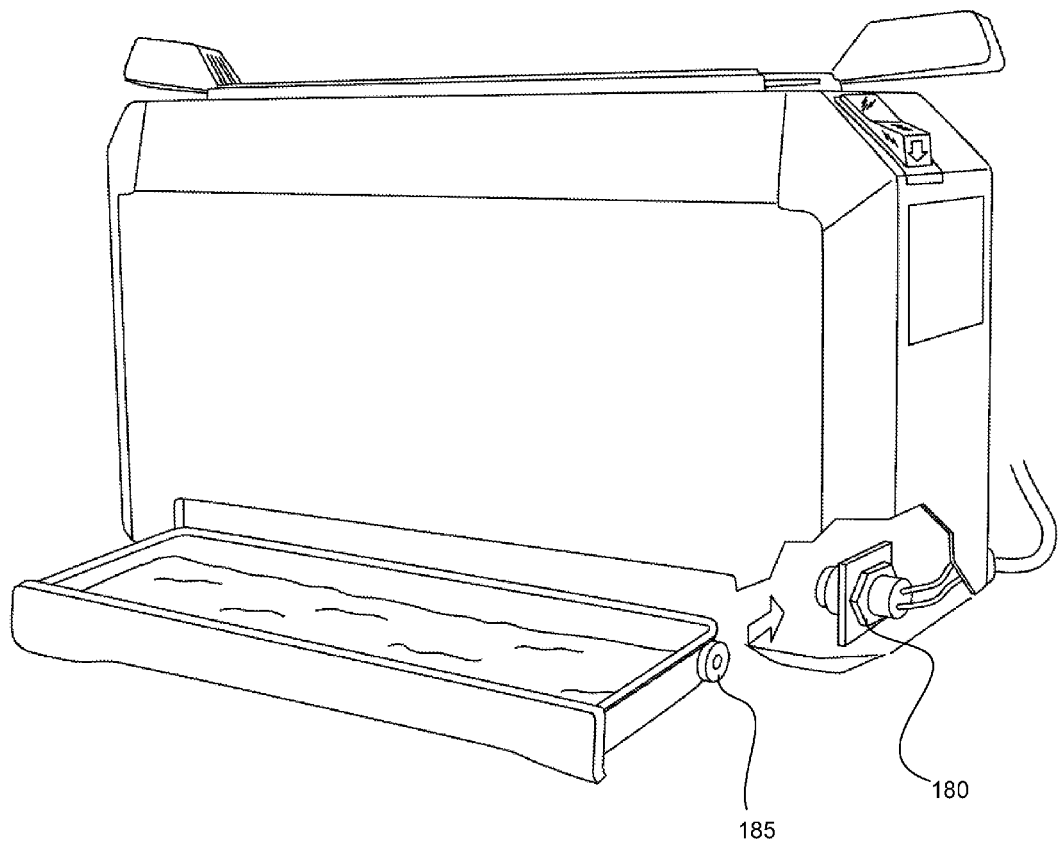
FIG. 16 is a perspective view of a grill having a safety system based on a proximity sensor for detection of movement of the drip tray between each use.

(13) In a variant of the electric grill, referring to FIG. 16, the safety mechanism comprises a proximity sensor 180 configured to detect a change in position of the receptacle 105. The receptacle in its docked position with the grill (which is during normal cooking for example, as shown in FIG. 12) comprises a first state of the sensor and any position where the grill is not docked comprises a second state of the sensor. The grill is configured to preclude operation of the grill until the state of sensor has changed at least once after the most recent occurrence of the grill being powered off. Optionally, the receptacle 105 has a sensor element 185 disposed on a side of the receptacle to function with the proximity sensor 180.

(14) In another variant of the electric grill, an electric grill for cooking food items comprises: a receptacle for receiving fats and breakaway solids generated during the cooking of the food; and a safety mechanism configured to prevent a fire in the unit.

Figure 17:
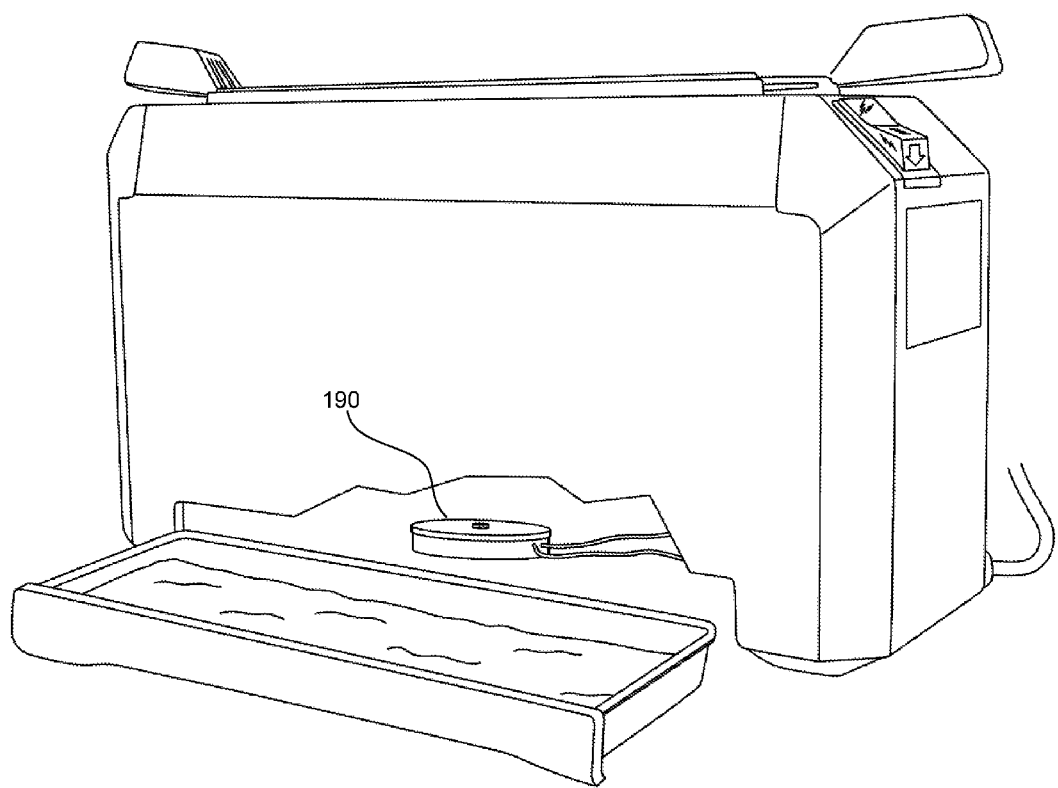
FIG. 17 is a perspective view of a grill having a safety system based on a weight sensor for detection of movement of the drip tray between uses.

(15) In a further variant of the electric grill, referring to FIG. 17, the safety mechanism comprises a weight sensor 190 disposed below the receptacle configured to output a signal based on the weight of the receptacle. The grill is configured to power off if the weight of the receptacle reaches a predetermined threshold amount.

Figure 18:
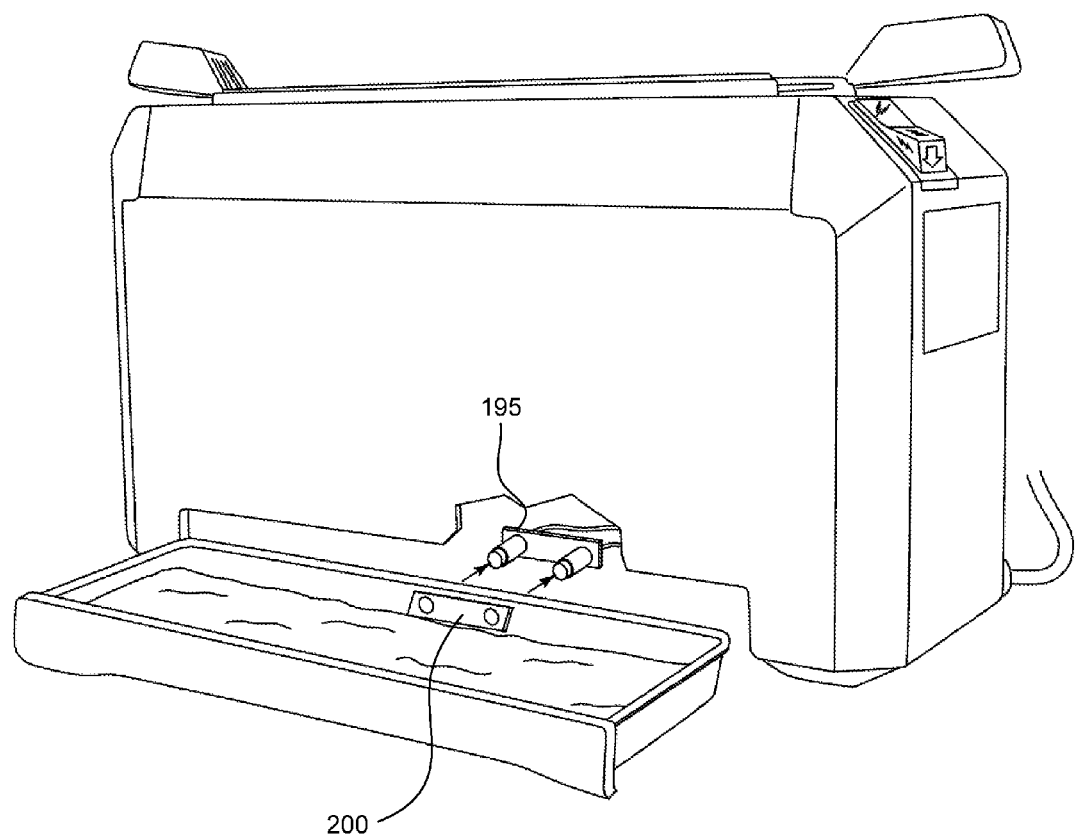
FIG. 18 is a perspective view of a grill having a safety system based on a liquid level sensor.

(16) In still another variant of the electric grill, referring to FIG. 18, the safety mechanism comprises a liquid level sensor 195 configured to measure the level of liquid in the receptacle. When liquid reaches the level of contacts 200 of the sensor, the sensor is tripped.

Figure 19:
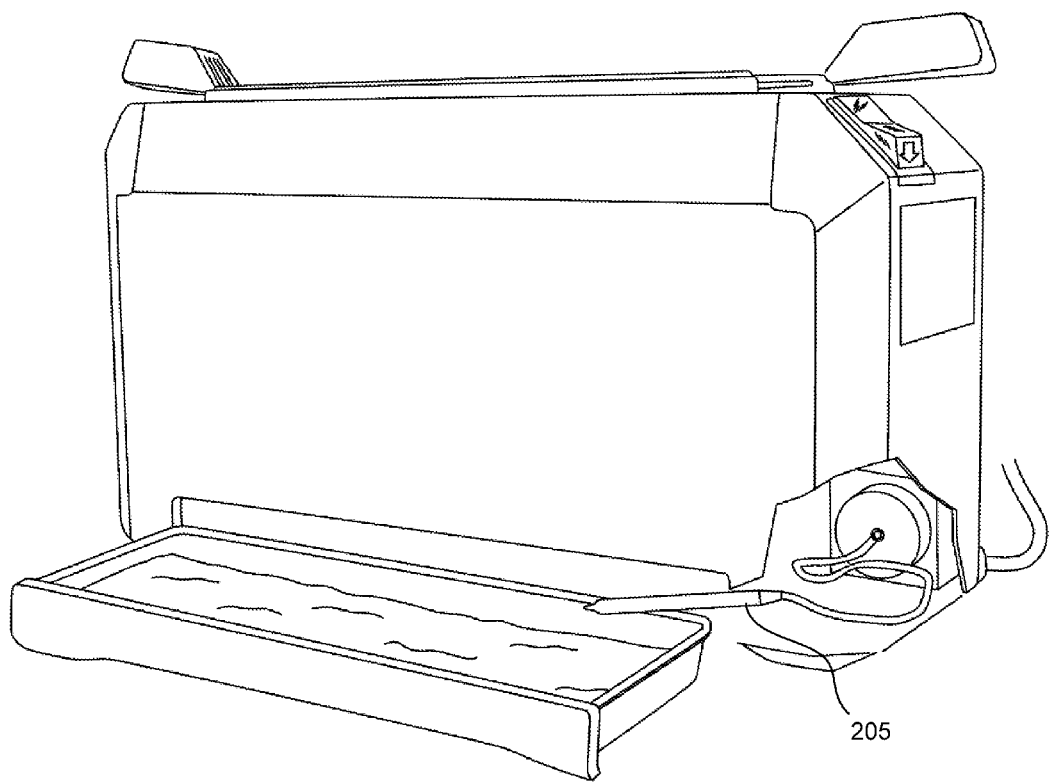
FIG. 19 is a perspective view of a grill having a safety system based on a temperature sensor.

(17) In yet a further variant of the electric grill, referring to FIG. 19, the safety mechanism comprises a temperature sensor 205 configured to measure the temperature inside the receptacle 105. Optionally, the sensor is configured to measure the mean temperature inside the grill. The grill is configured to power off or to preclude being powered on when the temperature sensor measures above a predetermined temperature.

Figure 20:
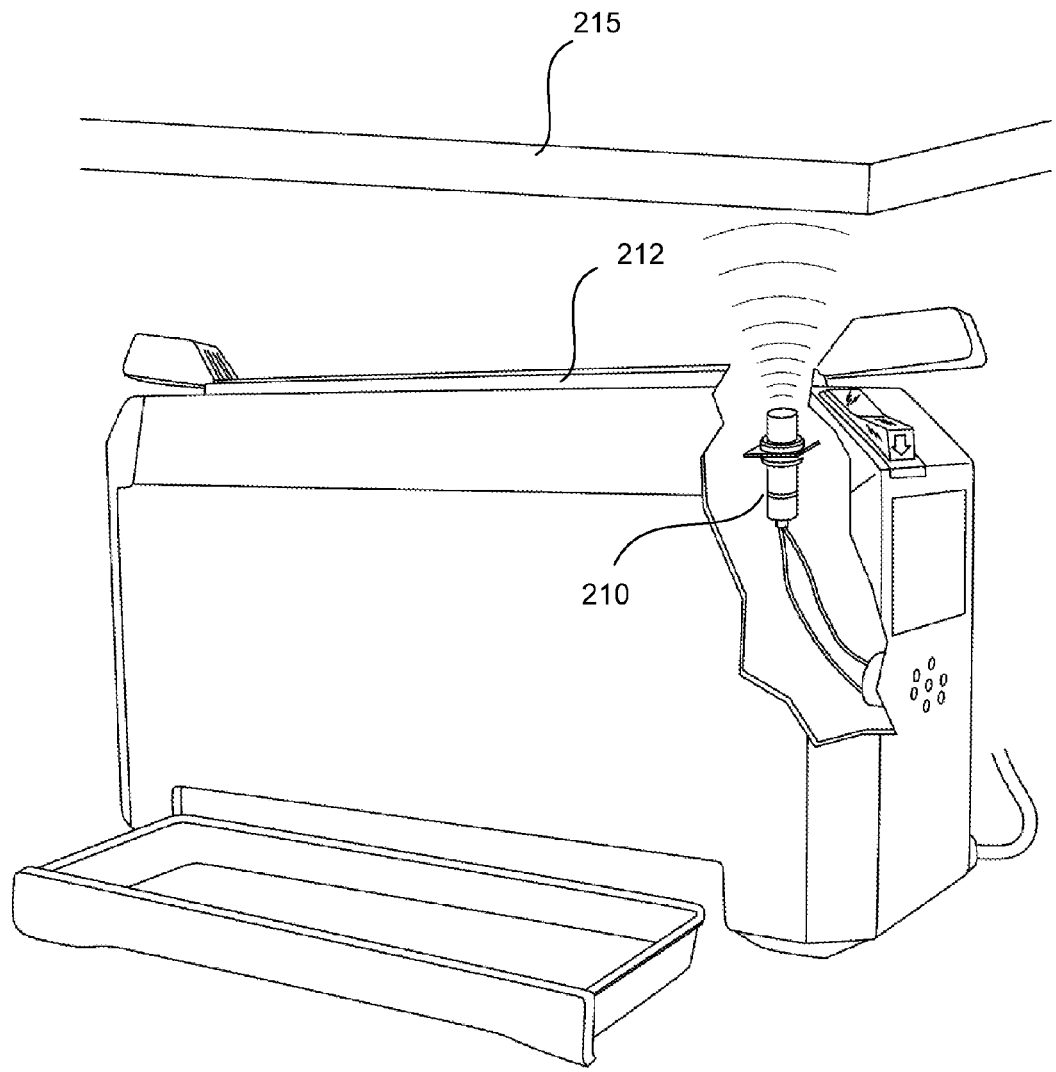
FIG. 20 is a perspective view of a grill having a safety system based on a proximity sensor for detection of obstructions near the grill.

(18) In a variant of the electric grill, referring to FIG. 20, the safety mechanism comprises a proximity sensor 210 configured to detect an obstruction 215 above an opening 212 of the grill. The grill is configured to power down or is precluded from powering on if the proximity sensor detects an obstruction within a predetermined distance from the opening.

Figure 21:
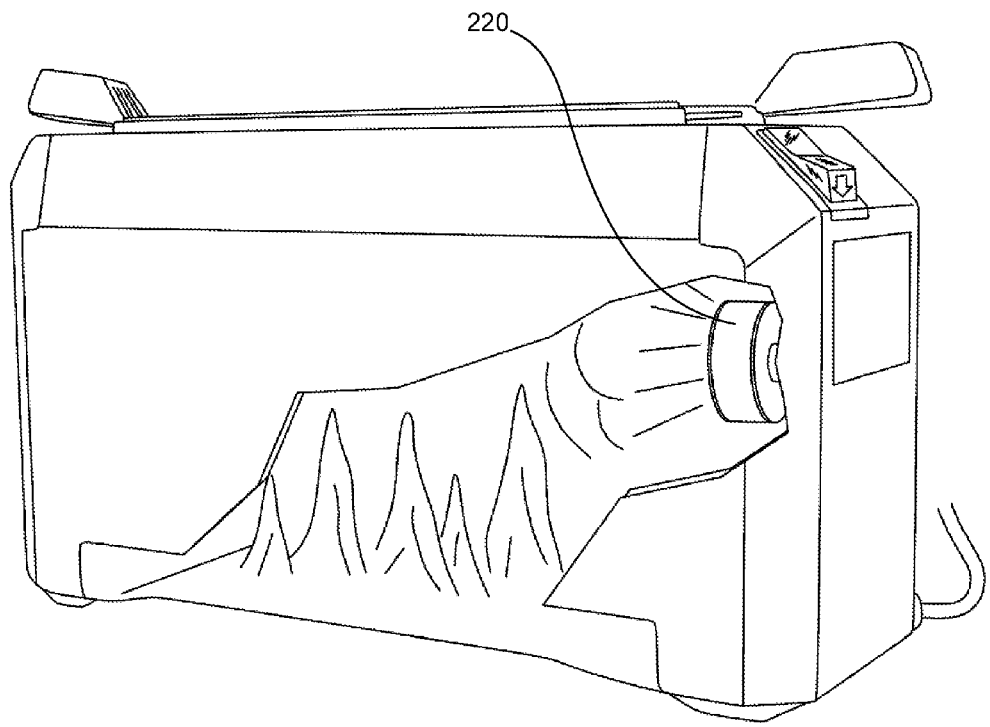
FIG. 21 is a perspective view of a grill having a safety system comprising a fire suppression system.

(19) In a further variant of the electric grill, referring to FIG. 21, the safety mechanism comprises a fire suppression system 220 configured to activate if the temperature of the grill reaches a predetermined temperature.

Figure 22:
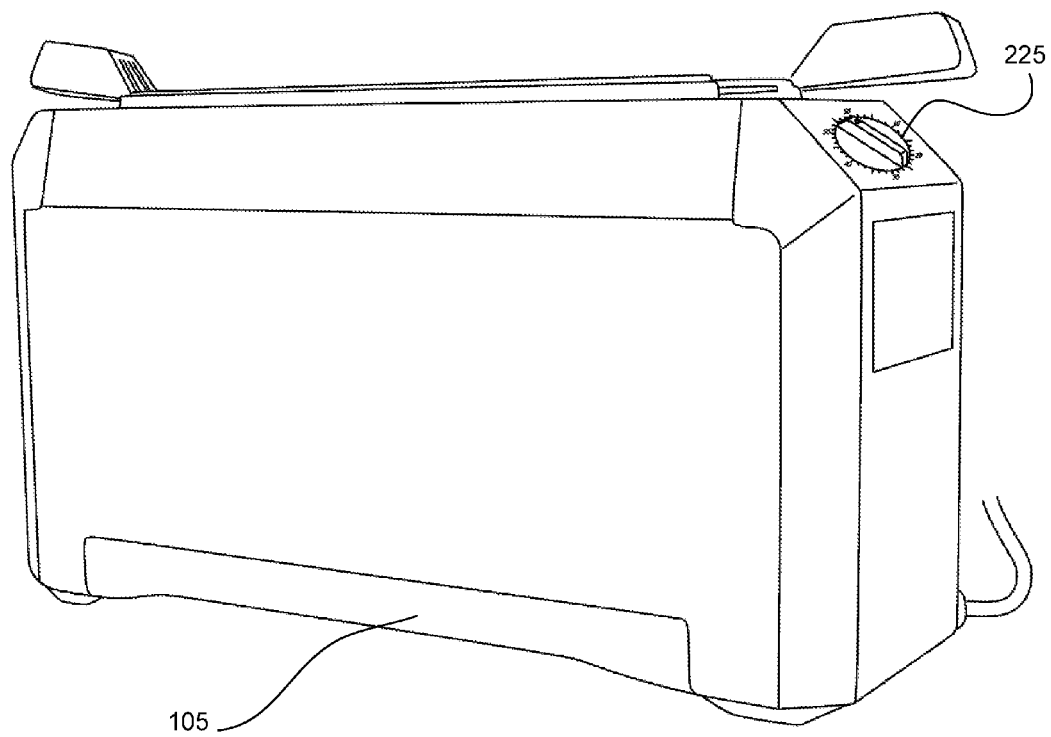
FIG. 22 is a perspective view of a grill having a safety system comprising a timing system.

In yet another variant, referring to FIG. 22, the safety mechanism comprises a timer 225. Optionally, the unit can only be powered on by turning the timer to the desired time. Optionally, the unit is powered on by simultaneously by turning the timer to the desired position.

Figure 23:
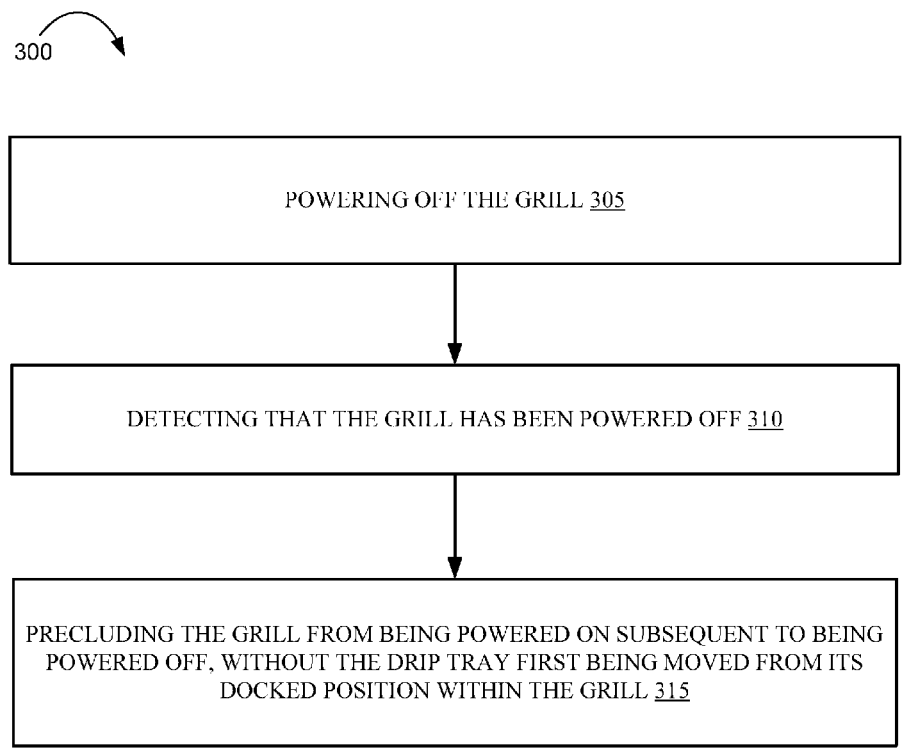
FIG. 23 is a flow chart of a method for ensuring safe operation of a grill.

(20) In another variant, referring to FIG. 23, a method 300 of ensuring safe operation of an electric grill having drip tray comprises: powering off the grill 305; detecting that the grill has been powered off 310; precluding the grill from being powered on subsequent to being powered off, without the drip tray first being moved from its docked position within the grill 315.

While various embodiments of the present invention have been described above, it should be understood that they have been presented by way of example only, and not of limitation.

Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An electric grill for cooking food items, comprising:
    a receptacle for receiving fats and breakaway solids generated during the cooking of the food;
    a safety mechanism configured to prevent the grill from operating without at least one movement of the receptacle subsequent to the grill being previously powered on;
    wherein the safety mechanism comprises a mechanical lock configured to mechanically engage the receptacle prior to the grill being powered off and mechanically disengage the receptacle when the grill is powered off, the mechanical lock, comprising:
        a power on off switch;
        a spring loaded plunger connected to the power on off switch;
        a spring configured to urge the receptacle out of the grill;
        a moveable stop disposed below the plunger and the moveable stop being biased upward toward the plunger, and configured to hold the receptacle against the spring; and
    a port in the receptacle, configured to receive the plunger, and the port disposed above the moveable stop, wherein when the power switch is placed in an off position, the plunger is pushed through the port, and the plunger is configured to push the moveable stop down to disengage the stop from holding the receptacle back against an urging of the spring.

2. The electric grill of claim 1, wherein the receptacle for receiving fats and breakaway solids comprises a receptacle external to the grill, wherein the safety mechanism is configured to prevent the grill from operating without at least one movement of the receptacle, the movement leading to the separating of the receptacle from the grill, and the movement being subsequent to the grill being powered on.

3. The electric grill of claim 1,
    wherein the mechanical lock is configured to lock the receptacle in place while the receptacle is under outward bias by the spring.

4. The electric grill of claim 3, wherein the moveable stop is configured to engage the receptacle after the grill is powered on and to hold the receptacle against a force of the spring.

5. The electric grill of claim 3, wherein the moveable stop is biased to maintain a position against the receptacle to prevent the receptacle from moving under an influence of the spring.

6. The electric grill of claim 1, wherein a side of the port is configured to allow the plunger to be pushed through the port, and the plunger is pressing down on the stop to move the stop away from the receptacle and the receptacle being released under the bias of the spring; and
    wherein ejection of the receptacle from the grill is not prevented while the plunger is through the port.

7. An electric grill for cooking food items, comprising:
    a receptacle for receiving fats and breakaway solids generated during the cooking of the food;

a safety mechanism configured to prevent the grill from operating without at least one movement of the receptacle subsequent to the grill being powered on, the safety mechanism comprising:
   a mechanical lock configured to mechanically engage the receptacle prior to the grill being powered off and mechanically disengage the receptacle when the grill is powered off, the mechanical lock, comprising:
      a power on off switch;
      a plunger connected to the power on off switch;
      a spring configured to urge the receptacle out of the grill;
      a moveable stop disposed below the plunger and the moveable stop being biased upward toward the plunger, and configured to hold the receptacle against the spring; and
   a port in the receptacle, configured to receive the plunger, and the port disposed above the moveable stop, wherein when the power switch is placed in an off position, the plunger is pushed through the port, and the plunger is configured to push the moveable stop down to disengage the stop from holding the receptacle back against an urging of the spring.

8. The electric grill of claim 7, wherein a side of the port is configured not to impede the plunger when the plunger is pushed through the port, and the plunger is pressing down on the stop to move the stop away from the receptacle and the receptacle being released under the bias of the spring; and
   wherein ejection of the receptacle from the grill is not prevented while the plunger is through the port.

* * * * *